(12) United States Patent
Steinich

(10) Patent No.: US 7,263,782 B2
(45) Date of Patent: Sep. 4, 2007

(54) CABLE ACTUATED POSITION SENSOR WITH SPRING LOCATED INSIDE THE CABLE DRUM

(75) Inventor: Klaus Manfred Steinich, Zorneding (DE)

(73) Assignee: ASM Automation Sensorik Messtechnik GmbH, Moosinning (DE)

( * ) Notice: Subject to any disclaimer, the term of this patent is extended or adjusted under 35 U.S.C. 154(b) by 120 days.

(21) Appl. No.: 11/025,512

(22) Filed: Dec. 29, 2004

(65) Prior Publication Data

US 2005/0160614 A1 Jul. 28, 2005

(30) Foreign Application Priority Data

Dec. 30, 2003 (DE) ................. 103 61 699

(51) Int. Cl.
*G01B 3/12* (2006.01)
(52) U.S. Cl. ............... 33/732; 33/734; 33/772
(58) Field of Classification Search ........... 33/732, 33/734–736, 739, 741, 756, 761, 763, 772, 33/773
See application file for complete search history.

(56) References Cited

U.S. PATENT DOCUMENTS 5,001,658 A 3/1991 Walters

| 5,236,144 | A | 8/1993 | Kautz | |
|---|---|---|---|---|
| 6,168,107 | B1 * | 1/2001 | Bishop et al. | 33/762 |
| 6,353,314 | B1 * | 3/2002 | Moerbe | 33/732 |
| 6,442,862 | B1 * | 9/2002 | Kimura et al. | 33/732 |
| 6,868,620 | B2 * | 3/2005 | Sanoner | 33/763 |

FOREIGN PATENT DOCUMENTS

| DE | 88 01 109.7 | 1/1988 |
|---|---|---|
| DE | 8801019.7 | 6/1988 |
| DE | 298 03 061 U1 | 2/1998 |
| DE | 198 52 182 C1 | 11/1998 |
| EP | 0745829 A1 | 4/1996 |
| EP | 0982562 A2 | 3/2000 |

* cited by examiner

*Primary Examiner*—Yaritza Guadalupe-McCall
(74) *Attorney, Agent, or Firm*—Head, Johnson & Kachigian

(57) ABSTRACT

As a rule, measuring cable position sensors consist of an axial arrangement of flat spiral spring, cable drum, and encoder. By locating the flat spiral spring within the interior of the cable drum, the construction length is reduced on one hand, and it becomes possible on the other hand to locate the cable outlet in one of the outer corners of the housing, which improves the application capabilities of the sensor.

19 Claims, 9 Drawing Sheets

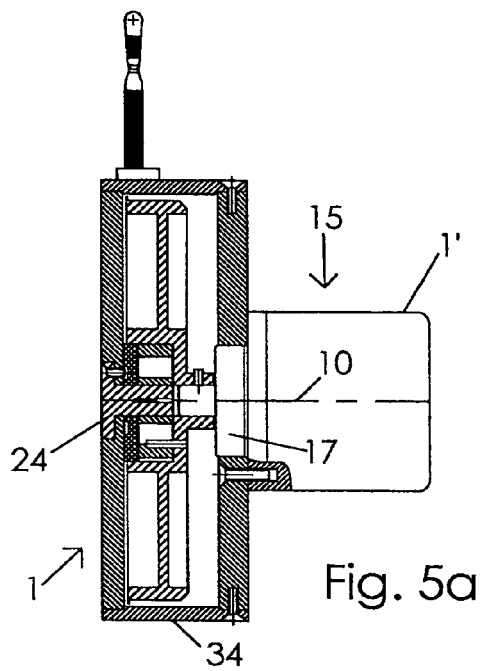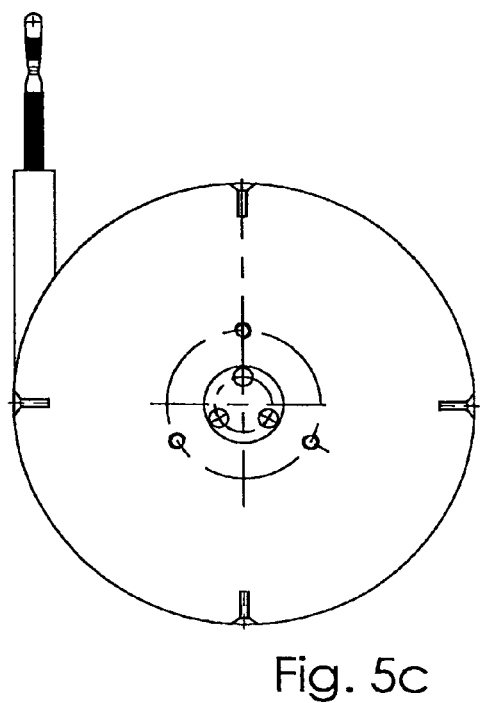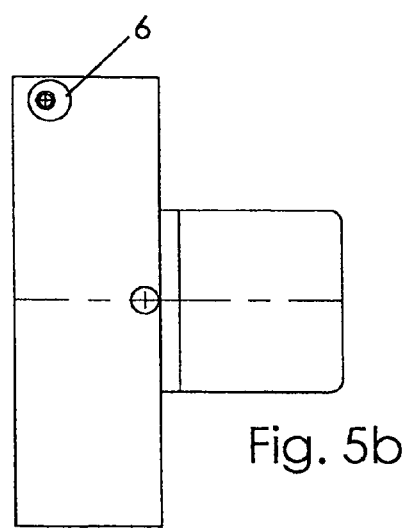

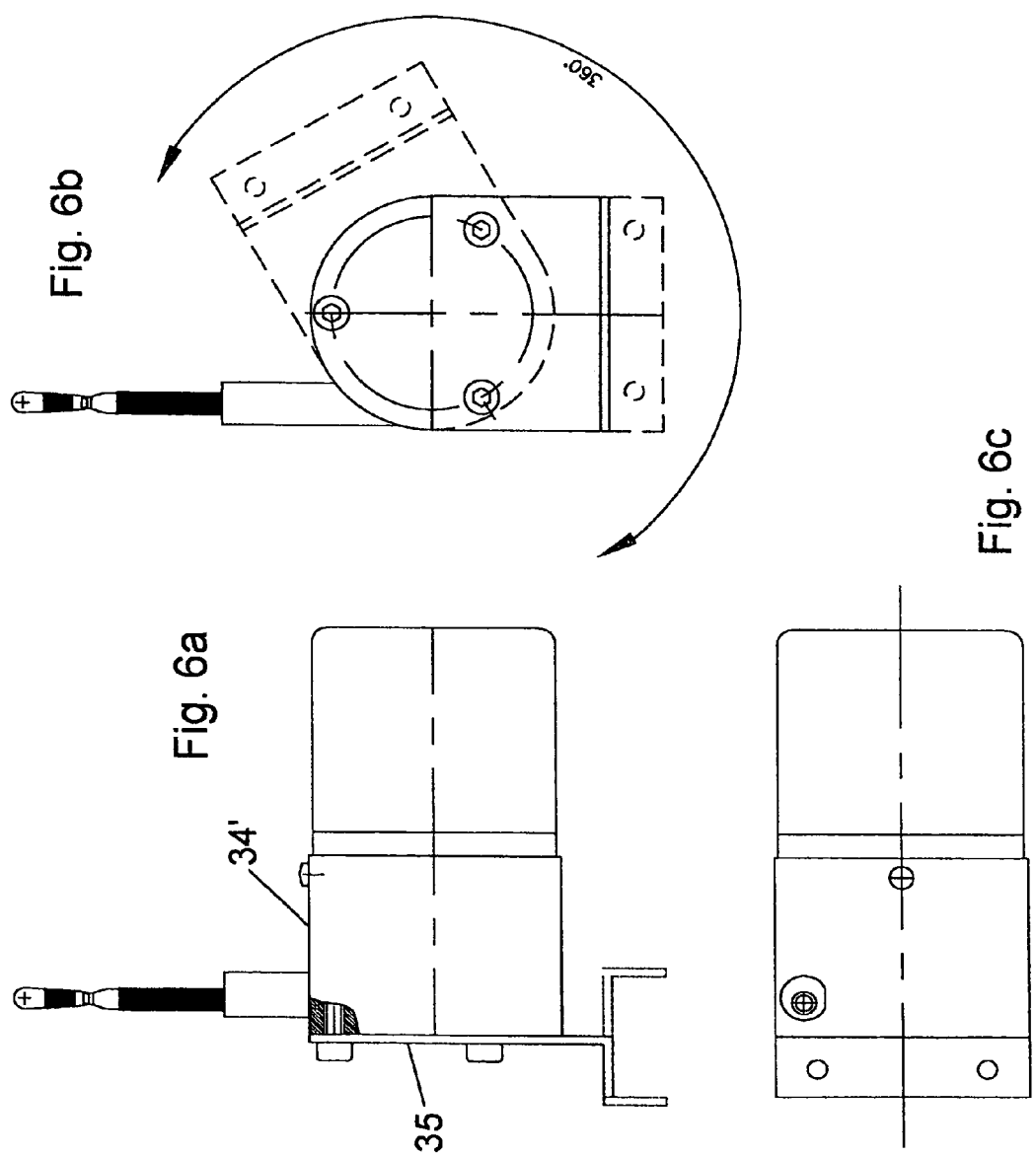

Figure 1A:
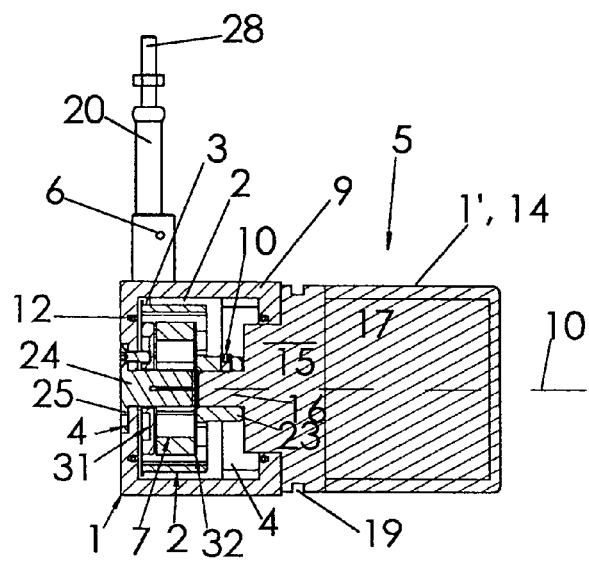

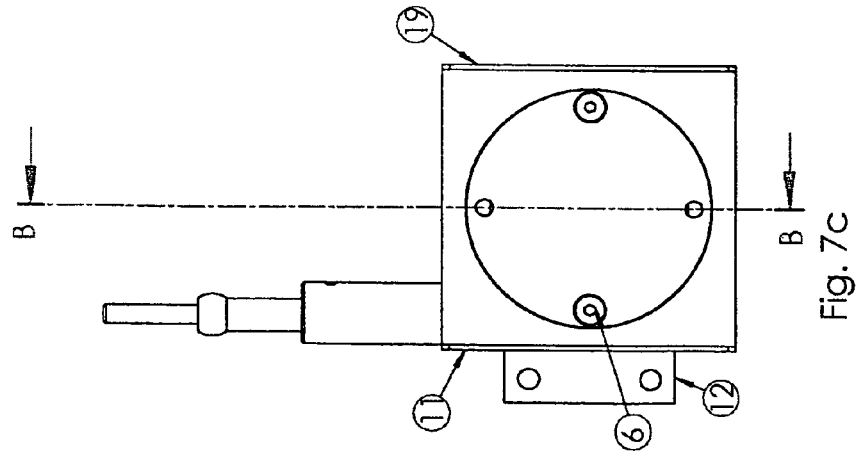
Fig. 7c
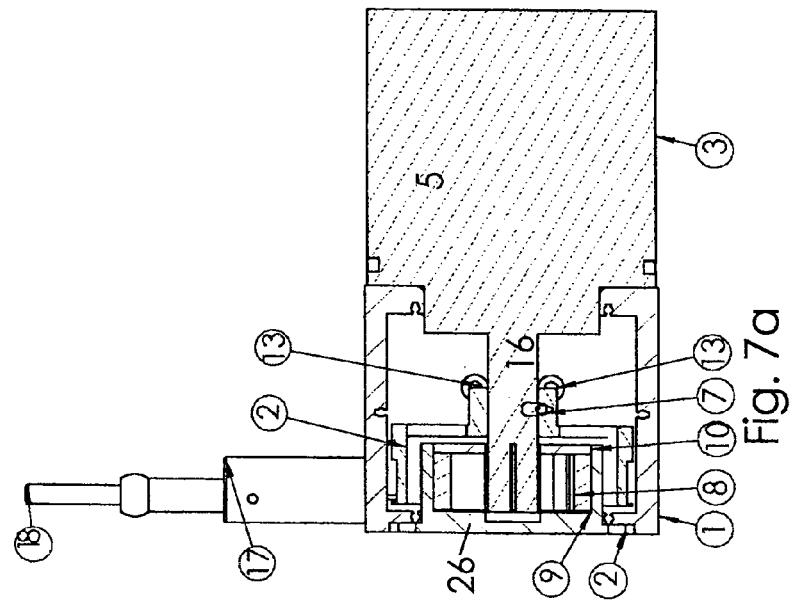
Fig. 7a
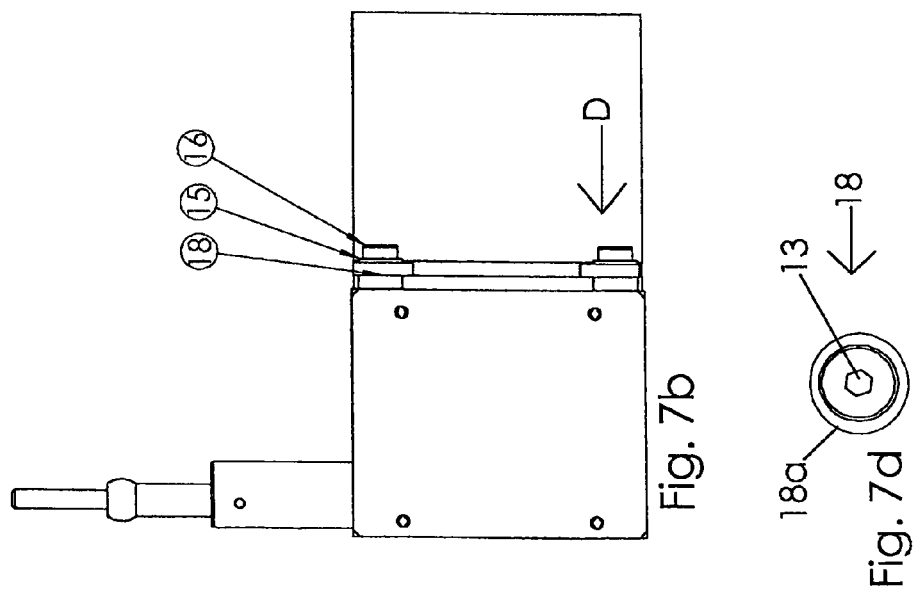
Fig. 7b
Fig. 7d

CABLE ACTUATED POSITION SENSOR WITH SPRING LOCATED INSIDE THE CABLE DRUM

CROSS-REFERENCE TO RELATED APPLICATION

This is a United States Patent application which claims priority to German Application No. 10361699.3 filed 30 Dec. 2003.

STATEMENT REGARDING FEDERALLY SPONSORED RESEARCH OR DEVELOPMENT

N/A

REFERENCE TO A MICROFICHE APPENDIX

N/A

BACKGROUND OF THE INVENTION

Field of the Invention

This type of cable actuated position sensor—depending on its corresponding use—must satisfy goals which may in part be contradictory.

On one hand, a high level of measuring accuracy which itself depends on the specific use, on the other hand, a maximum possible cable length adapted to the use, i.e. measurement range, and simultaneously optimum performance during the winding of the cable, which is related particularly to the change in tension force and pulling capacity and thus the return force of the measuring cable as a function of the extended cable length.

In addition to these specific characteristics, general requirements such as minimum manufacturing costs, small size and good ease-of-assembly, and thus also easy reparability are to be maintained.

On the basis of these considerations, it was customary in the past—in designs, in which the main components, i.e. the flat spiral spring, cable drum and rotation angle sensor were arranged axially with respect to each other—that these elements were placed in the axial direction in this sequence.

This arrangement was necessary on the one hand because the cable drum should be positioned as closely as possible to the shaft of the turning angle sensor since any play between the cable drum and the shaft, especially in the direction of rotation, leads to inaccurate measuring results, as well as to a turning of the cable drum that is not entirely concentric relative to the shaft of the turning angle sensor. On the other hand, the cable drum was located at the end of the arrangement since the spring is the part that is the most difficult to handle and operate mechanically and also because it has to be "wound" after it is mounted for final assembly which is easier to do if the spring is located at one of the two ends of the sensor.

BRIEF SUMMARY OF THE INVENTION

It is thus the task of the present invention to create a cable actuated position sensor which features considerable cable extension length and measuring accuracy despite its simple, cost effective assembly, maximum compactness, especially quite short in length, and can be easily installed in the inner corners of a receiving component.

This problem is solved by the characteristics of claims 1 and 20. Advantageous designs and embodiments are derived from the secondary claims.

Due to the arrangement of the spring, especially the flat spiral spring within the axial length of the cable drum, i.e. preferably inside the cable drum, the overall length of the sensor is reduced. The cable drum can thus be simultaneously located in a longitudinal direction near the front wall of the position sensor casing.

This means that the sensor may also be positioned in the interior corners of a receiving component such that the cable run out is located very close to this interior corner and consequently the extended cable travels very close to this interior corner and is well protected.

Mainly due to the combination of the cable inlet tower position near one of the casing's outer edges extending in a longitudinal direction, the tower can be positioned within or near one of the casing's outer corners, and especially at a constant distance to both the front outer surface as well as to the adjacent longitudinally extending outer surface, which simplifies the planning of its positioning and mounting on the receiving component.

To accomplish this, the cable inlet tower is not arranged in the center of the axial space of the cable drum's winding area as is customary, but above the front end of the cable drum. The tower is extended so that the cable can be wound over its complete winding range without jumping the windings, i.e. while securely maintaining a single layer winding, in order to permit the coverage of the complete axial winding range of the cable drum, without exceeding the maximum allowable excursion angle.

Preferably—if this suffices for the required measurement length—the mechanical casing in whose interior the cable drum and spring are located—is configured with a transverse axis, which corresponds to the longest transverse axis, especially the outer diameter, of the turning angle sensor.

For longer cable length requirements, either the axial dimension/coverage of the winding range may be increased, and analog to this the length of the tower, i.e. the distance between the cable inlet opening and the contact point of the cable on the cable drum, or the cable drum diameter is increased with the result that the mechanical casing then has a larger diameter than the turning angle sensor.

The housing of the mechanical interior—when viewed in a longitudinal direction, i.e. along the rotational axis of the turning angle sensor, may be rectangular, preferably square, or even circular, wherein the cross sectional shape of the turning angle sensor, hereinafter generally referred to as encoder for short, is circular as a rule.

The encoder is generally a purchased item, consisting of an attachment from whose face a neck protrudes, out of which the shaft extends, which can rotate relative to it. At the other end of the attachment, the analysis electronics is accommodated which is protected by a cap-shaped housing connected to the attachment. Opposite to this housing of the electrical interior space, the housing of the mechanical interior is located at the far end of the attachment, which is configured rectangular, especially as a square, when viewed in the direction of the rotational axis of the encoder, mostly a section of a closed hollow profile.

The attachment, or rather the neck of the attachment, i.e. of the encoder, is plugged into a close tolerance hole drilled in one wall of the profile and rigidly connected to it. For this purpose, an attachment groove extends along the outside surface of the attachment into which tension claws can be inserted which are bolted to the overhanging corners of the rectangular, square or any other shape of the mechanical component housing.

The open sides of the profile section are closed by sheet metal, especially bent metal sheets, or by profiles with single or multiple elbows, wherein the protruding legs may be used for fixing or aligning with respect to another component. The bolting is located preferably within the bolting grooves, which extend in a longitudinal direction of the profile segment into which self-tapping screws may be installed.

The housing of the mechanical interior compartment may, however, also be configured with a circular cross section, while being designed as a deep-drawn component, and be identical in shape to the housing of the electrical interior compartment.

For attachment, a face plate of a profile segment extending in a longitudinal direction can also be used, which serves as the housing of the mechanical interior compartment, and here again especially in the form of an angled or perpendicularly bent fitting.

Also, a fastening leg extending from the mechanical compartment interior can be located at a specific position for fastening to a supporting component.

The cable drum, in which the spring is accommodated, is preferably designed as a pot shape and oriented with its open side towards the adjacent housing front wall so that during installation the spring can be placed into the cable drum from this side.

The cable drum features a mounting flange, which is oriented away from the interior open space with respect to the spring and in whose center drilled hole the shaft of the turning angle sensor, i.e. of the encoder, can be inserted and anchored against rotation by a transversely bolted clamping screw.

Generally, one problem of cable actuated position sensors of this type consists in the fact that the cable must not be accelerated too severely during its winding, i.e. the cable drum, propelled by the spring in the winding direction, must not develop too high a torsion moment in order not to damage the cable during the stopping at the end of the winding process, or even to permit the cable to fail. However, this torsion moment varies during the winding process as a function of the mass increase of the wound up cable.

Due to the spring placement inside the cable drum, which is one of the causes of the generated torsion moment, the mass as well as its radial position and thus the torsion moment of the rotating unit consisting of cable drum, cable, and spring can be influenced by the winding behavior of the flat spiral spring during the winding up or unwinding of the spring.

In this context, it is important that in the free space available for the spring, the spring never fill this empty space completely, but rather—usually at one location of the radial process—a greater radial distance is present between the windings of the spring. Since the outer end of the spring is attached to the outer circumference of the empty compartment, and the spring inner end is connected to the inner circumference of the empty compartment, a relocation of the distance available between the windings in the radial direction takes place during the winding up or unwinding of the spring—i.e. a relative rotation of the inner end against the outer end over many revolutions—and thus an eccentricity of the center of gravity of the spring mass is given in the radial direction.

The direction in which the spring's center of gravity shifts can be determined by selecting the non-rotating spring end, or the spring end rotating with the cable drum at the outer or inner end.

In a preferred design, the spring inner end is connected to a point of the housing, while the spring outer end is anchored to the inner circumference of the pot-shaped cable drum, i.e. rotates with the cable drum. This causes the spring mass to be concentrated near the inner radius of the free space for the condition of the maximum cable extension, while the spring mass is more closely concentrated near the spring outer circumference for the completely wound up cable. Therefore, if the cable is released in its position of maximum extension and the cable drum is accelerated in its winding up direction by the spring, the torsion moment of the rotating unit is relatively small, when considered on an absolute scale, since a small amount of cable length is yet wound up on the cable drum. However, the spring center of gravity is located relatively far out on the radius at this point. With increasing winding up of the cable, the mass of the rotating unit increases, yet the center of gravity of the rotating mass travels simultaneously towards the center, so that due to this compensation, the resulting torsion moment remains essentially constant throughout the winding process.

The inner spring end attached to the housing is anchored by a tension bolt, which—usually equipped with a center slot—is inserted from the outside into a central hole drilled in the housing front wall, and extends into the axial range of the spring, and is there plugged onto the inner end of the spring. By torquing the tension bolt—which additionally has an enlarged tension flange with respect to the tension bolt itself, which bears onto the outside front surface of the housing—the spring is tensioned and anchored in the desired wound up condition with respect to the housing.

In this case, the installation proceeds such that the cable is attached to the cable drum, in particular, it is wound onto it, the free end of the cable is threaded through the cable inlet tower from the inside to the outside, the cable drum is positioned inside the housing for the mechanical part, the encoder with its shaft is pushed from the outside into the housing of the mechanical interior compartment such that the shaft extends into the attachment flange of the cable drum, the cable drum is rotated such that the clamping screw can be inserted from the open side of the casing and fully torqued, the tension bolt is inserted from the front side through the housing until it is connected with a positive fit, in any case blocked against rotation, to the inner end of the spring, which was initially mounted in the cable drum and whose outer end had been connected to the cable drum.

the tension bolt is—when the cable is completely wound up on the cable drum—rotated in the direction of increasing biasing of the spring until a desired sufficient biasing of the spring is achieved in its wind-up direction, and the tension bolt is locked in this biased position with respect to the casing by torquing the tensioning flange to the front surface of the housing.

If the length is to be reduced further in an axial direction, the attachment flange of the cable drum, which faces away from the interior compartment of the spring and only serves for inserting the encoder shaft, is preferably omitted.

To achieve a sufficient axial overlapping of the attachment flange and the shaft, the shaft may partially extend into the interior of the free compartment of the spring, and the attachment flange as well, while under normal circumstance the shaft does not extend into the axial range of the spring.

For a few applications it may make sense to select the radial shifting of the spring mass differently, i.e. to anchor the inner end of the spring to the cable drum, i.e. co-rotating, while the outer end of the spring is anchored to the housing. In this case, a chuck is used instead of a tension bolt, the circumferential wall of which is located near the interior free space of the cable drum, and to which the outer end of the spring is anchored, and with the help of which the spring is biased against the housing by rotating and subsequent anchoring of the chuck to the housing.

By contrast, in this case, the inner end of the spring is anchored to the hub of the cable drum, which for this purpose extends in the axial direction into the range of the spring, while the shaft also extends preferably into this range. For example, only the shaft, yet not the hub of the cable drum, may extend into the axial range of the spring, and the spring is anchored at its inner end directly to the shaft of the encoder, which may be configured for example with a slot at the front side, mounted, for example, by inserting the chamfered inner end of the spring into the slot of the shaft.

BRIEF DESCRIPTION OF EXAMPLES

Figure 2A:
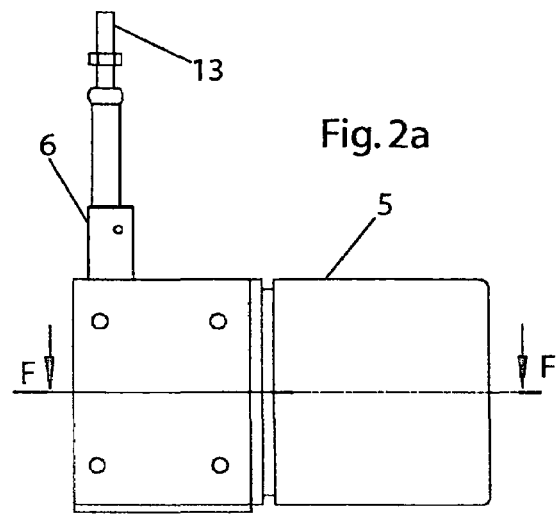
Figure 2B:
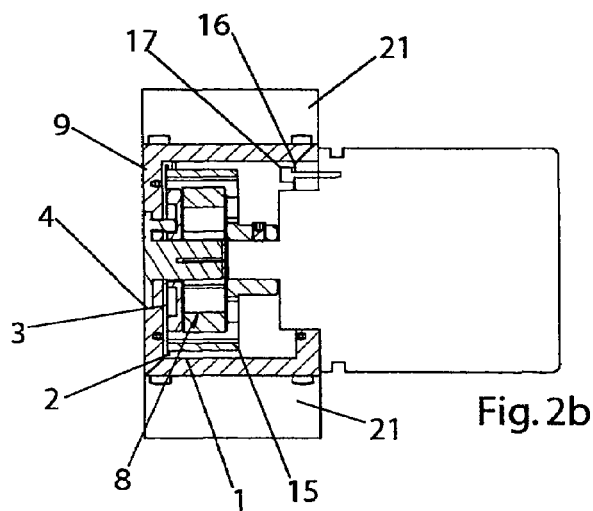
Figure 2C:
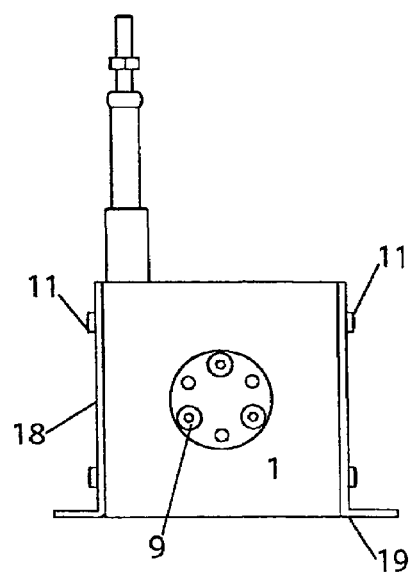
Figure 3A:
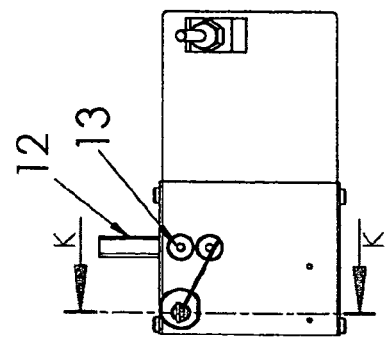
Figure 3B:
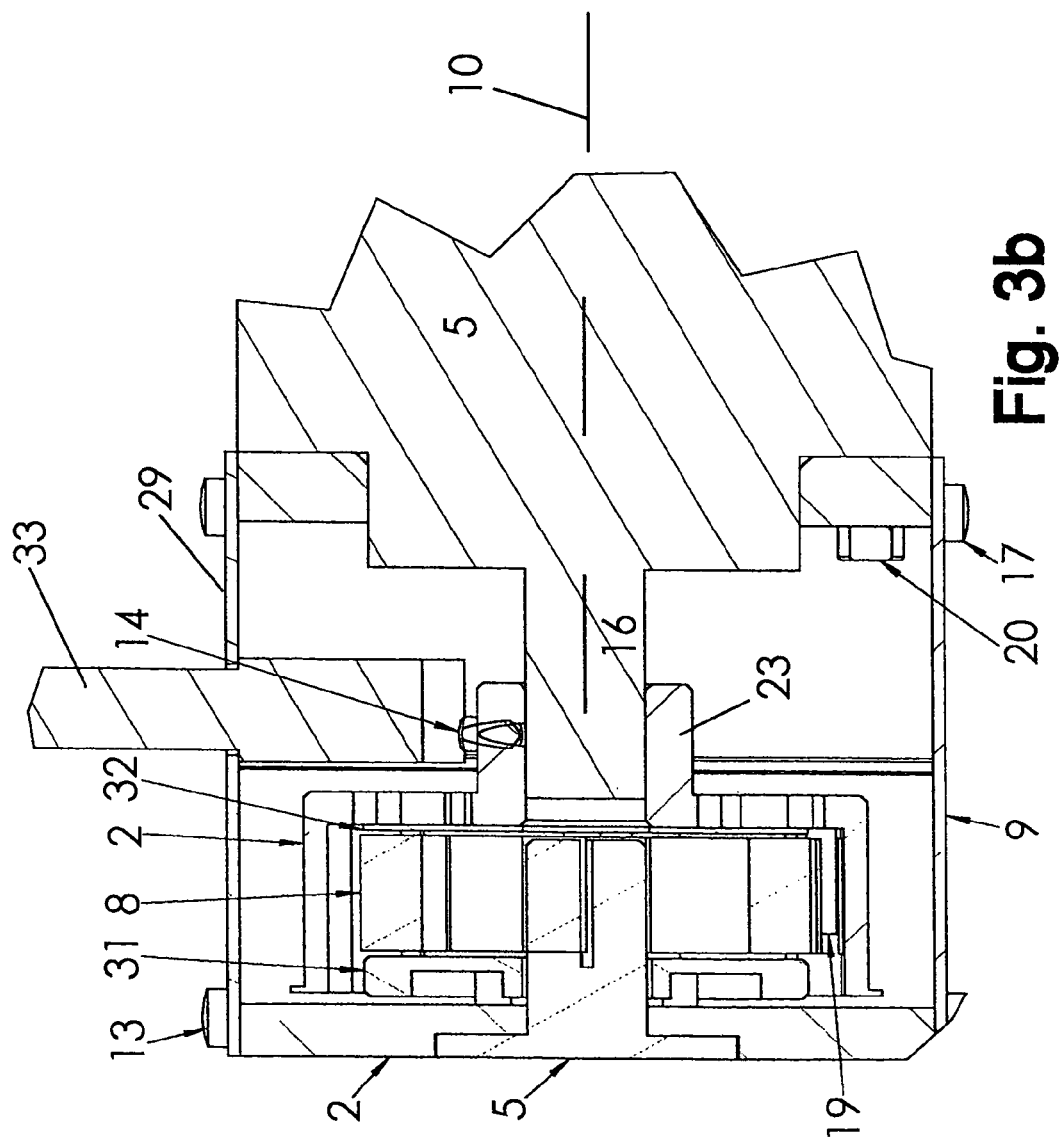
Figure 4C:
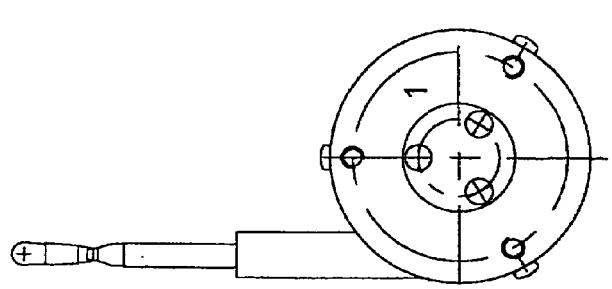
Figure 4A:
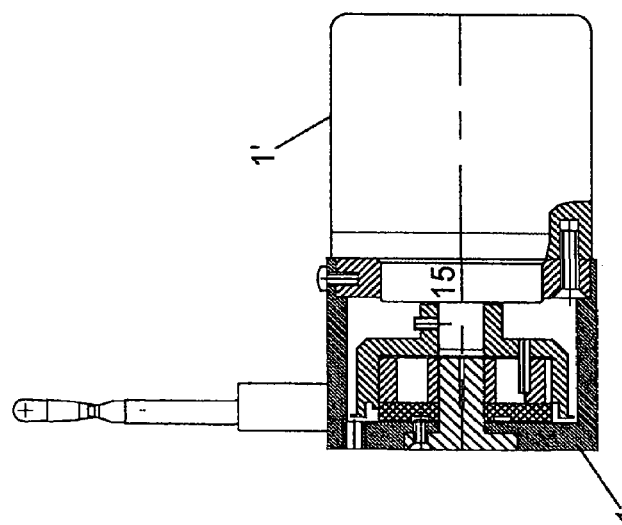
Figure 4D:
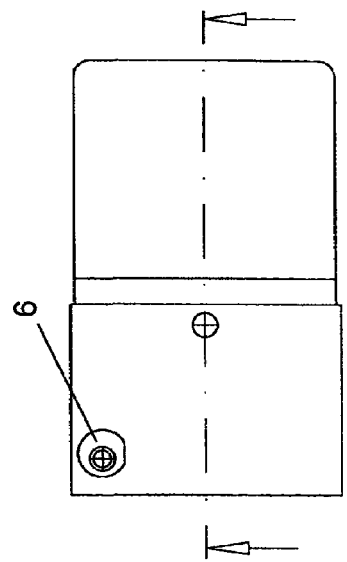
Figure 4B:
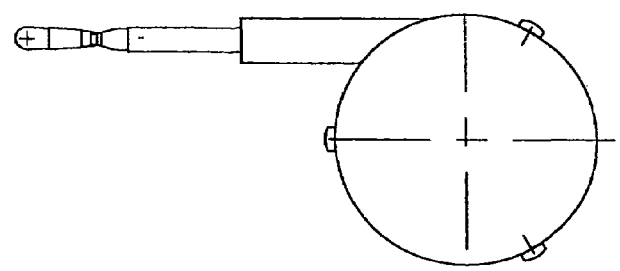

Examples of configurations according to the invention are described in more detail by examples below. Shown are:

FIGS. 1(a)-(d): a first design of the sensor in various views,

FIGS. 2(a)-(c): a second design with a different attachment to the surrounding structure, FIGS. 3(a)-(b): a third design with yet another attachment, FIGS. 4(a)-(d): a fourth design with a constant circular cross section, FIGS. 5(a)-(c): a fifth design with enlarged cable drum, FIGS: 6(a)-(c): a design with an offset attachment on one side, FIGS: 7(a)-(d): a design in which the inner end of the spring rotates with the cable drum, and FIGS: 8(a)-(b): a presentation of a concept of the displacement of a flat spring in an annular space during the winding process.

BRIEF DESCRIPTION OF THE PREFERRED EMBODIMENTS

Figure 1C:
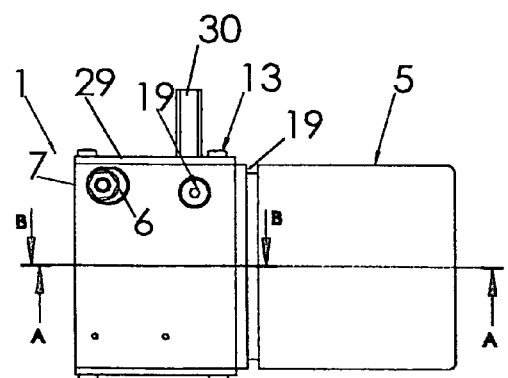
Figure 1D:
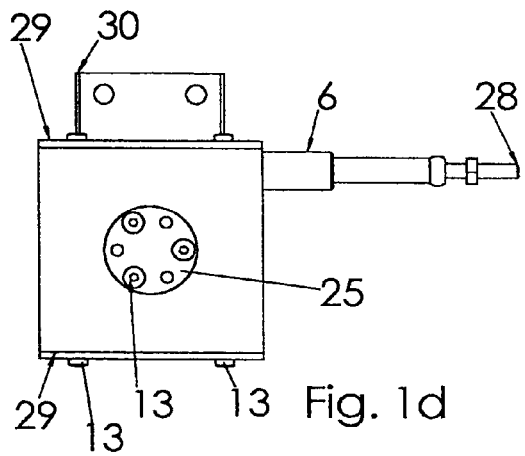
Figure 1B:
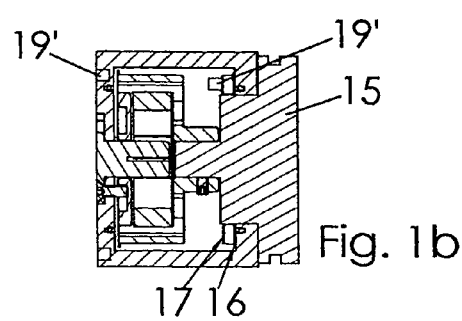

First, the basic structure of the sensor is to be described on the basis of FIG. 1, as it is best recognizable in the longitudinal section representations of FIGS. 1a and 1b as cut along lines A-A and B-B of FIG. 1c.

In the mechanical interior compartment 4, which is defined by the interior of the corresponding housing 1, a cable drum 2 is installed to rotate on which the measurement cable 3 is wound, which extends to the outside through the cable inlet tower 6.

In this case, the pot-shaped cable drum 2 is oriented with its open side to the nearest outer wall, i.e. in FIGS. 1a and 1b to the left side, and in its hollow interior, rigidly connected to a wound up flat spring 7, which biases the cable drum 2 in the wind up direction, due to which measurement cable 3 is fully wound up on the cable drum 2 (not shown) in an unloaded state, so that the terminal lug 28, with its adjoining impact damper 20 at the free end of measurement cable 3 bears against the free end of the front side of the cable inlet tower 6. Axially adjacent to flat spiral spring 7, one bearing disk 31 each, e.g. of low friction plastic material, is located per side to prevent the rubbing of spring 8 especially against the interior circumference of housing 1 and its profile 9. In the interior, tower 6 is designed with a widening conical taper towards the cable drum in order to permit the alignment of measurement cable 2 during the winding up process in the longitudinal direction 10, the rotational axis of cable drum 2 because an always precisely reliable, single layer winding on the cable drum is desired, since only then a certain angle of rotation of cable drum 2 will always correspond to the identical length of travel of the cable end, which is connected to the subject to be monitored with regard to its shifting.

A rotation angle sensor 5, e.g. an encoder, is rigidly fastened against rotation to the cable drum 2, which precisely records the rotation of the cable drum and transmits them as a signal of length measurement—for example, in parallel as an absolute and also as a relative length measuring signal. Encoder 5 is usually a purchased item out of the front side of which shaft 16 protrudes. Transducer 5 consists essentially of a transducer attachment part 15, as is best recognized in FIG. 1b, which features a centrally protruding neck 17 out of which in turn shaft 16 protrudes, which is housed in attachment part 15 as well as its neck 17, to rotate freely. On the back side of attachment part 15, the analysis electronics—not shown—is accommodated, which is protected by a cover shaped housing 1, which is located at and rigidly connected to the far side of attachment part 15.

The transducer 5 is attached to the mechanical housing 1 such that its shaft 16 extends into the drilled center hole of cable drum 2, and with minimum possible play and there is attached in a certain relative rotational position with respect to each other, in this case by a transversely installed clamping screw, or also by adhesives, press fit, or other methods.

In the present case and for this purpose, an attachment flange 23 into which shaft 16 can be inserted faces away from the cable drum 2 in the direction of its hollow interior.

The wall of the otherwise box shaped and circumferentially closed hollow segment 9, which forms housing 1, has a drilled hole on the side of the rotational angle sensor 5, into which neck 17 of attachment part 15 fits precisely.

The cable drum 2 is directly fastened to shaft 16, the placement of which inside of attachment part 15 is thus also utilized for cable drum 2, so that an optimum alignment between cable drum 2 and shaft 16 is guaranteed which improves measuring accuracy.

Figure 8A:
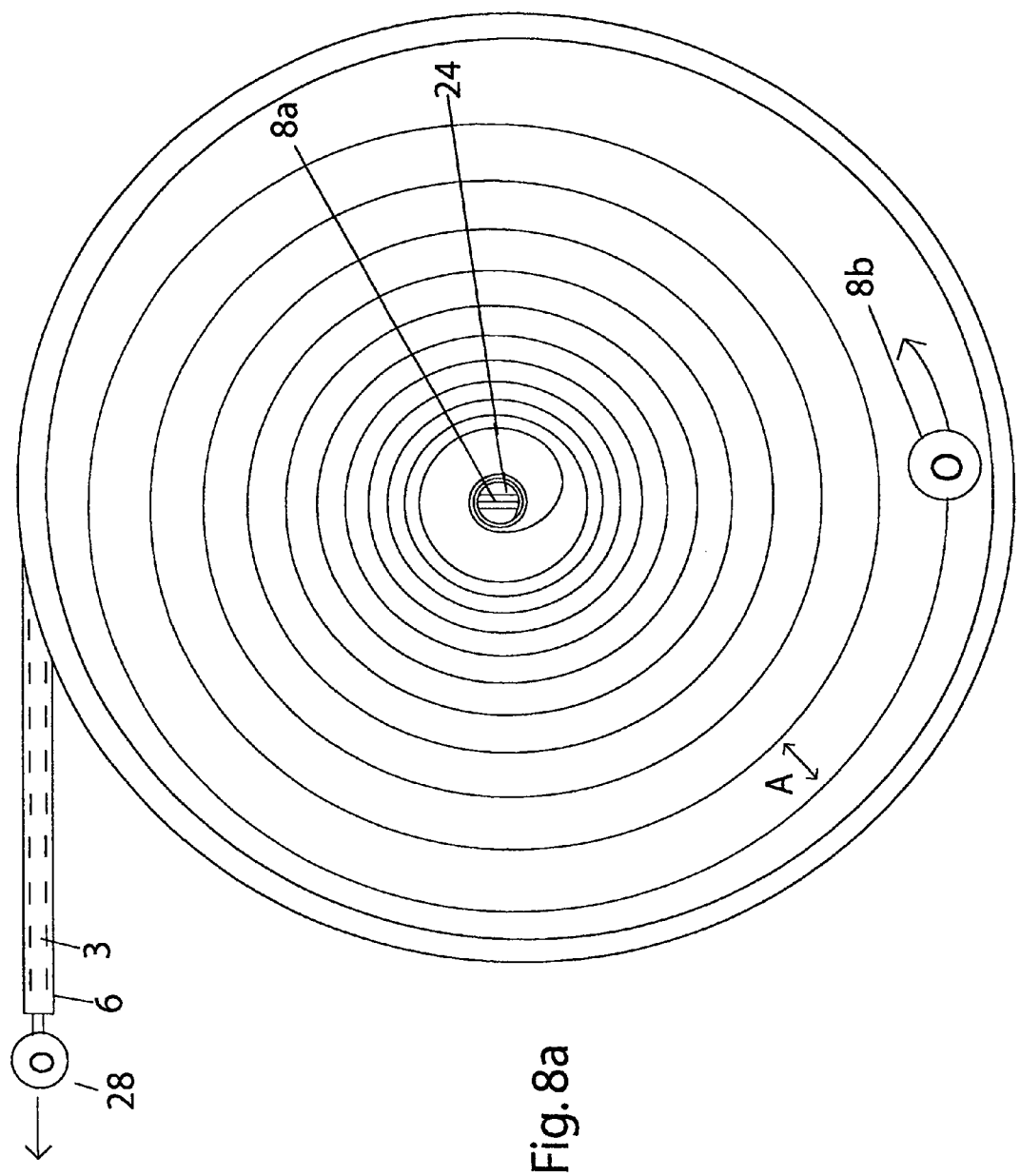

Flat spiral spring 8, which is wound up spirally in layers in a single plane perpendicular to longitudinal direction 10, is rigidly fastened at its free outside end to cable drum 2, and with its inside end to a point which is rigidly connected to housing 1 and does not rotate with cable drum 2, as presented in the conceptual drawings of FIG. 8.

In this case, the point anchored to the housing is tension bolt 24, which is inserted from the side opposite of rotation angle sensor 5, through a corresponding drilled hole in the wall of housing 1, and extends into the empty space within the axial length range of cable drum 2 and thus of the spring 8. Here, tension bolt 24 is anchored against rotation to the inner end of spring 8, as a rule by axial insertion of the sharply bent, inner end of flat spiral spring 8 into a slot on tension bolt 24 which is open to the front side and oriented in a longitudinal direction.

Tension bolt 24 features a radial overhanging tension flange 25 at its outer front end, which bears—as a rule in a corresponding recess—on the outer surface of housing 1, features a circular outer contour (see FIG. 1*d*) and can be fastened there in any desired rotational position relative to casing 1 by means of fastening screws 13. Prior to this however, spring 8 is wound up to some extent relative to the housing by rotating the tension flange 25, which is already connected to spring 8, in order to generate the necessary biasing in the wind up direction on the cable drum and thus on measuring cable 3. For this reason, there are indentations on the outside of the tension flange 25 for inserting a corresponding winding tool.

In this case, housing 1 of the mechanical interior is manufactured from a segment 7 of a rectangular, circumferentially closed hollow section 9, e.g. of continuous casting aluminum. The laterally open front surfaces of segment 7 are closed off by covers 29 at the completion of assembly, for example, by sheet metal parts or shaped profiles, which are bolted to the hollow profile 9 preferably in the corner areas by fastening screws 13, by threading them at corresponding locations into profile grooves 12 available on the inner circumference of hollow shape 9, into which the self-tapping fastening screws 13 can be installed. The anchoring of rotation angle sensor 5 to housing 1 occurs by means of the tension claws 18, not shown in FIG. 1, which however are shown in FIGS. 7*b* and 7*d*, and grip the fastening groove 19 of attachment part 15 with their lateral overhang radially from the outside, while fastening screws 13, which penetrate tension claw 18, are tightened inside the overhanging corners—opposite to the round casing of transducer 5—of housing 1, which is of rectangular shape, when viewed in the direction of the rotational axis.

A sectional view, viewed in a longitudinal direction 10, shows the winding condition of flat spiral spring 8, when measuring cable 3 is completely wound up on cable drum 2, i.e. its free end lug 28 bears against the free end of tower 6.

Most windings of spring 8 are close together near the outer circumference of the annular free space available for the spring of cable drum 2, while an increased distance A results between the windings located most closely to the center. The inner end 8*a* of the spring with its sharply bent end is anchored at a fixed location in a slot of tension bolt 24 and does not rotate with cable drum 2. In contrast, the outer end 8*b* of the spring is connected to the cable drum 2.

Figure 8B:
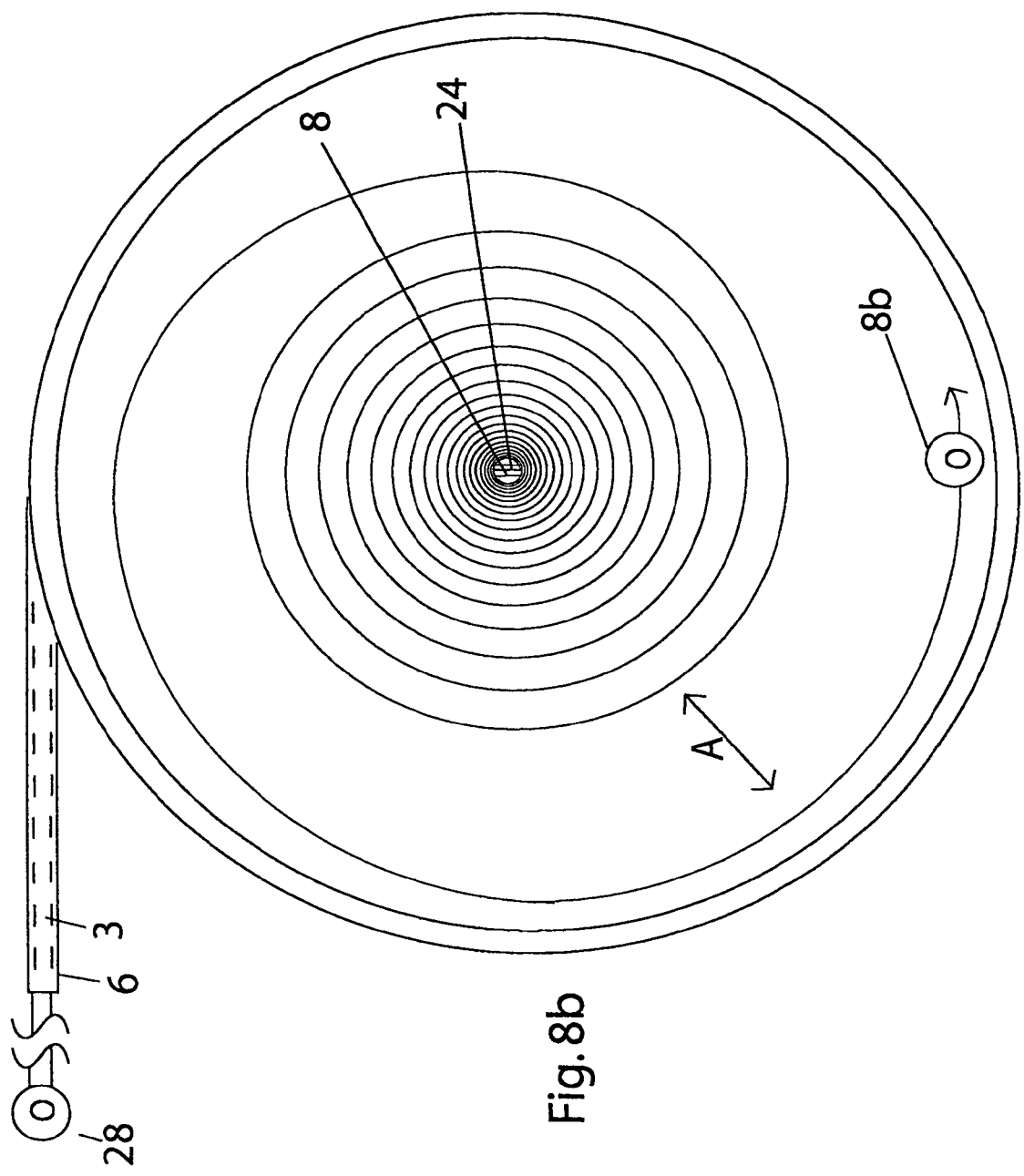

With increased pulling out of the end lug 28, and hence of the measuring cable 3 from cable drum 2, spring 8 is wound up further and further, while its outer end 8*b* rotates with the cable drum 2. Spring 8 is wound up tighter and tighter with the result that the windings approach the smaller, inside diameter, so that the greater distance A, which is generally recognizable at one spot between the windings, travels further to the outside. In the terminal condition, i.e. for the fully extended measuring cable 2 and maximum tensioned, i.e. closely wound, spring 8, as shown in FIG. 8*b*, the majority of the windings are located close together and wound around the tension bolt 24, which serves as the core, while the greater radial distance A occurs between the windings located the farthest out.

According to FIG. 1, the fastening of the cable actuated measuring position sensor to the surrounding area, i.e. to a structural component, on which the sensor is to be mounted and installed, with the aid of a fastening profile 30, which protrudes past one of the open front surfaces of profile 9, and is firmly connected to profile 9 and features access openings for bolting to the receiving structural component.

The design of FIG. 2 differs from that of FIG. 1 by the fact, that instead of the covers 29 of FIG. 1, angle sections 21 are used, one leg of which like cover 29 covers one of the open sides each of profile 29, while the other leg, which points away from housing 1, can be used for attachment, for example, for the bolting to a supporting structural component.

The design per FIG. 3 differs in that the connection to the surrounding area is provided by an anchor plate 33, which protrudes from one of the open front surfaces of profile 9, while cover 29 requires a corresponding opening for this purpose. The anchor plate detail extending into the mechanical interior is fastened to profile 9 by anchor bolts 13, which are screwed in from the outside.

FIG. 3*b* also demonstrates that the axial dimension of the mechanical interior, when measured in the direction of the rotational axis and thus in a longitudinal direction 10, depends on how closely the cable drum 2 can be moved to the attachment part 15 of the rotation angle sensor 5.

As shown in the solutions of FIGS. 1 to 3, shaft 16 of transducer 5, protrudes into the corresponding attachment flange 23 of cable drum 2, but not, however, into the interior nor into the axial range of spring 8. For a long, protruding shaft stud 16, this already causes a great axial dimension just as the configuration of a voluminous anchor plate 33 within the axial range between cable drum 2 and attachment part 15 of the measurement data sensor 5 and/or the attachment flange 23 of cable drum 2, which protrudes for the purpose of bolting it to shaft 16.

FIG. 4 show a design of the sensor, in contrast to the solutions of FIGS. 1 to 3, the solution per FIG. 4 differs from these in that not only the housing 1' of the rotation angle sensor is designed with a circular cross section, but also housing 1 of the mechanical interior. In this case, it represents a pot-shaped housing which is placed on the attachment part 15 and is, for example, bolted to it by a spacer ring.

Also the use of two identical housings is feasible, especially pot-shaped housings 1, 1' for the mechanical and the electrical interior spaces.

While the diameter of the mechanical interior of housing 1, as shown in FIG. 4, is nearly identical to that of the electrical interior of housing 1', FIG. 5 shows a solution, in which the housing 1 of the mechanical interior—when viewed in a longitudinal direction—is also designed as a circle, yet features a significantly larger diameter than housing 1' of sensor 15. This solution is often unavoidable, when especially great extension lengths of the measuring cable and by these great measurement lengths are required.

Additionally, housing 1 is not designed as a pot shape in this case, but it consists of a segment of a circular pipe profile 34, against the front face of which corresponding round end covers are placed, i.e. partially inserted, which in turn feature the necessary openings for tension bolts 24 and neck 17 of the sensor 15.

The solution per FIG. 6 differs from that of FIG. 5 on the one hand by the fact that the housings 1, 1', each of circular cross section, feature approximately the same diameter as in FIG. 4, and in addition the cover 35, which closes the front facing free end of pipe shape 34', protrudes radially on one side beyond pipe profile 34', and features a single or multiple bends in its overhang, wherein the overhanging, especially the bent portions serve for attaching the unit to a structural component supporting the sensor.

All remaining details not mentioned per FIGS. 2 to 6, especially the arrangement and design of the components inside the mechanical interior as well as all other details, do not differ from the solution per FIG. 1.

FIG. 7 shows a solution, which corresponds to that of FIG. 1 with respect to its basic design.

The first difference, however, consists in that the shaft 16 of rotation angle sensor 5 protrudes further and extends into the axial range inside of cable drum 2 and this way also into the axial range of spring 8 and even penetrates it completely.

This is desired because in this case—and thus in contrast to FIG. 8—the inner end of spring 8 is rigidly connected to shaft 16 against rotation and thus also to cable drum 2 by insertion of the bent spring end into the slot of shaft 16.

In contrast, the outer end of spring 8 does not rotate with cable drum 2 and is anchored locally to the inside surface of the outer walls of a pot-shaped tension chuck 26, which is inserted through a correspondingly larger drilled hole in the outer wall of casing 1, analogously to tension bolt 24, and protrudes into the interior of cable drum 2, albeit with the outside circumferential walls of tension chuck 26 near the radial outer ends of the free space of cable drum 2.

By the insertion of tension chuck 26 in an axial direction, the radial outer end of spring 8 is anchored to the former so that—analogous to tension bolt 24—tension chuck 26 can subsequently be used for biasing spring 8 by its rotation relative to the housing.

In this way, the mass shifting of spring 8 during the winding process is opposite to the processes described in FIG. 8.

While the invention has been described with a certain degree of particularly, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

REFERENCE MARK LIST

1' casing (transducer)
1 housing (mechanical)
2 cable drum
3 measuring cable
4 mechanical interior
5 rotation angle sensor
6 cable inlet tower
7 segment
8 spring
9 hollow profile
10 longitudinal direction
11 edge
12 tapping groove
13 anchor screws
14 cap-shaped casing
15 transducer attachment
16 transducer shaft
17 neck
18 tension claw
19, 19' fastening groove
impact damper
21 angle section
22 free space
23 attachment flange
24 tension bolt
25 tension flange
26 tension chuck
27 front end
28 end lug
29 cover
30 attachment profile
31 spacer disk
32 spacer disk
33 anchor plate
34 pipe profile
35 cover
A offset

The invention claimed is:

1. A measuring cable position sensor, said sensor comprising:
   a measuring cable wound on a cable drum biased in a wind-up direction by a spring located inside of the cable drum;
   a rotation angle sensor having analysis electronics; and
   a casing of a mechanical interior plugged to the neck of a transducer-attachment forming a positive connection with the transducer-attachment and fastened by means of tension claws which grip into a circumferential fastening groove of the transducer-attachment part, the casing being a segment of a closed hollow profile having a dimensional direction extending perpendicular to a longitudinal direction, and the casing having a front face of a segment of hollow profile closed by mounted covers in the form of angled sheet metal or angled sections.

2. A measuring cable position sensor in accordance with claim 1 wherein said spring is flat, spiral and entirely located in an axial direction inside said cable drum.

3. A measuring cable position sensor in accordance with claim 1 wherein said cable drum is fastened directly to a transducer shaft.

4. A measuring cable position sensor in accordance with claim 1 wherein said casing of said mechanical interior is cap shaped with an open side facing towards said rotation angle sensor.

5. A measuring cable position sensor in accordance with claim 1 wherein said casing of said mechanical interior is designed as a cuboid having an outer surface and features attachment grooves on its outer surface, extending parallel to edges of said casing and equally spaced from the edges.

6. A measuring cable position sensor in accordance with claim 1 wherein said hollow profile features several tapping grooves on its interior circumference near the inner edges, for screwing in anchor screws in a longitudinal direction of the tapping grooves.

7. A measuring cable position sensor in accordance with claim 1 wherein said housing of said mechanical interior when viewed in a longitudinal direction, features a circular cross section, which is the same diameter as a casing of an electrical interior.

8. A measuring cable position sensor in accordance with claim 1 wherein said cable drum is pot shaped with an attachment flange, which faces away from an empty space and which is perpendicularly penetrated by a drilled and threaded hole for anchoring to a transducer shaft.

9. A measuring cable position sensor in accordance with claim 1 wherein tap grooves are identical in shape to said attachment grooves and are designed as combination grooves.

10. A measuring cable position sensor, said position sensor comprising:
    a housing having a front end, at least one corner and an extending end surface;
    a measuring cable wound on a cable drum being biased in a wind-up direction by a spring;

a rotation angle sensor rigidly connected to the cable drum; including the analysis electronics; and a cable inlet tower being located near the front end of the housing of the position sensor and being so great in length that the excursion range of the measuring cable limited by the tower in only one direction of excursion is so great that the complete axial extent of the winding range of the cable drum can be covered without endangering a single layered winding of the cable drum.

11. A measuring cable position sensor in accordance with claim 10 wherein said cable inlet tower is located in one corner of said housing of a mechanical interior of the position sensor, and is equally distanced from the front end and of a nearest extending end surface of said housing in a longitudinal direction.

12. A measuring cable position sensor in accordance with claim 10 wherein said cable inlet tower is located eccentrically to an axial dimension of said cable drum offset in a direction of the front end of housing of the mechanical interior.

13. A measuring cable position sensor, said sensor comprising:

a measuring cable wound on a cable drum biased in a wind-up direction by a spring located inside of the cable drum;

a rotation angle sensor having analysis electronics;

a casing of a mechanical interior plugged to the neck of a transducer-attachment forming a positive connection with the transducer-attachment and the casing, when viewed in a longitudinal direction, features a square cross section with an edge length corresponding to or greater than a largest cross section of a housing of an electrical interior; and tension claws to join the housing of the mechanical interior and housing of the electrical interior located in the areas of square housing for the mechanical interior wherein said tension claws grip into a circumferential fastening groove at the transducer-attachment.

14. A measuring cable position sensor in accordance with claim 13 wherein said tension claws for connecting the housing of the mechanical interior and the housing of the electrical interior can be utilized in an identical manner for anchoring said measuring cable position sensor to another structural component by means of attachment grooves.

15. A measuring cable position sensor, said sensor comprising:

a measuring cable wound on a cable drum biased in a wind-up direction by a spring located inside of the cable drum;

a rotation angle sensor having analysis electronics; and a transducer shaft that does not protrude into an empty space of the cable drum.

16. A measuring cable position sensor, said sensor comprising:

a measuring cable wound on a cable drum biased in a wind-up direction by a spring located inside of the cable drum;

a rotation angle sensor having analysis electronics;

a flat spiral spring connected to said cable drum at its outer end and to a casing of a mechanical interior at its inner end with a tension bolt, which can be rotated relative to the casing and rigidly joined to it; and wherein said tension bolt can be inserted from outside into the casing and features a tension flange, which bears against the casing from outside.

17. A measuring cable position sensor, said sensor comprising:

a measuring cable wound on a cable drum biased in a wind-up direction by a spring located inside of the cable drum;

a rotation angle sensor having analysis electronics; and a transducer shaft extending into an opening in the cable drum in an axial direction and rigidly connecting to an inner end of the spring, while an outer end of the spring being anchored to a tension chuck that can rotate relative to a housing of a mechanical interior and be anchored in a desired rotational position.

18. A measuring cable position sensor in accordance with claim 17 wherein said tension chuck can be inserted into said housing from outside and features a tension flange, which sits on the outside of said housing.

19. A measuring cable position sensor, said sensor comprising:

a measuring cable wound on a cable drum biased in a wind-up direction by a spring located inside of the cable drum;

a rotation angle sensor having analysis electronics;

a casing of a mechanical interior plugged into a neck of a transducer-attachment forming a positive connection with the transducer-attachment and fastened by means of tension claws which grip into a circumferential fastening groove of the transducer-attachment part; and tap grooves identical in shape to said fastening grooves and designed as combination grooves.

* * * * *